Patented Oct. 24, 1922.

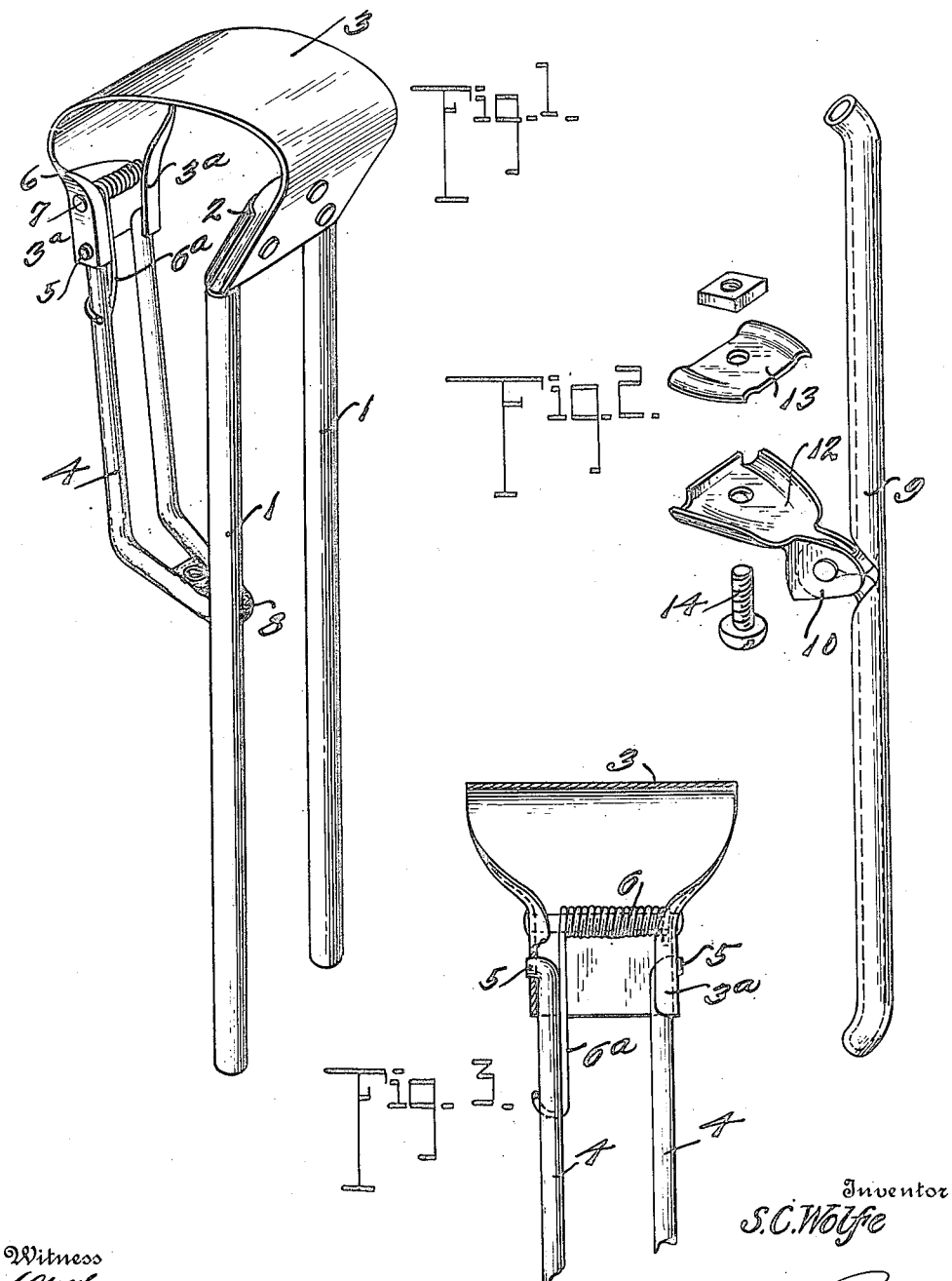

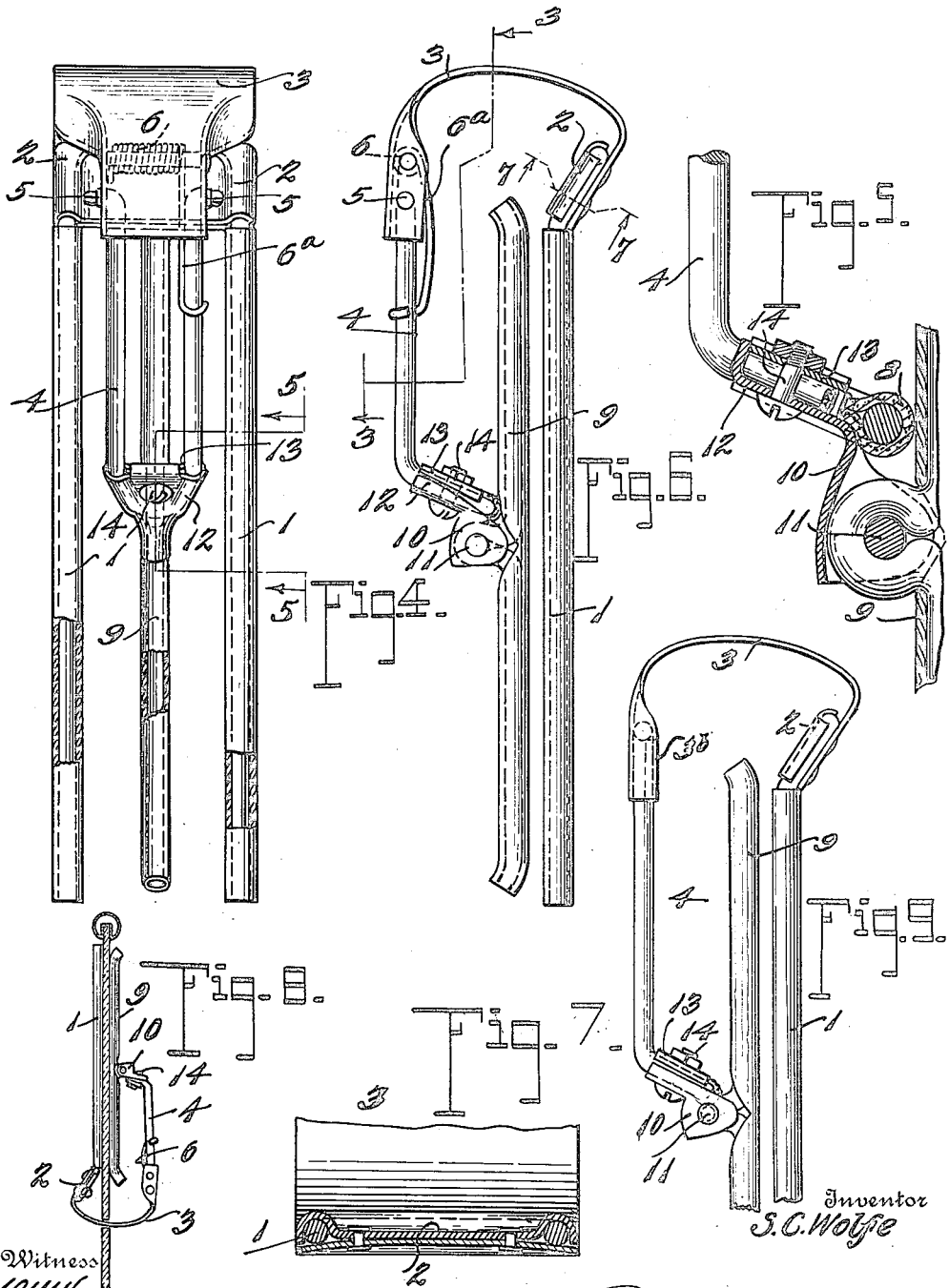
S. C. WOLFE.
WINDSHIELD CLEARER.
APPLICATION FILED JUNE 6, 1917.
1,432,819. Patented Oct. 24, 1922.
2 SHEETS—SHEET 2.

1,432,819

UNITED STATES PATENT OFFICE.

SAMUEL C. WOLFE, OF ANGOLA, INDIANA, ASSIGNOR TO FERNALD MANUFACTURING COMPANY, OF NORTH EAST, PENNSYLVANIA, A CORPORATION.

WINDSHIELD CLEARER.

Application filed June 6, 1917. Serial No. 173,146.

*To all whom it may concern:*

Be it known that I, SAMUEL C. WOLFE, a citizen of the United States, residing at Angola, in the county of Steuben and State of Indiana, have invented certain new and useful Improvements in Windshield Clearers, of which the following is a specification.

This invention comprises an improved wind shield clearing device of the type disclosed in my Letters Patent No. 1171377 granted February 8th, 1916, and covering a clearing device known on the market at the present time as the "Clear-o-scope." I have aimed to provide various improvements in my previous construction of said Letters Patent, the form of the arch of my device being changed so that it may be used in an inverted position received between the upper and lower sections of a wind shield as compared with the position of its preferred use according to the embodiment heretofore patented. I utilize, furthermore, a novel connection intermediate the arch and the handle of my device, said connection facilitating the application of the clearing device to the wind shield by affording somewhat greater freedom of relative movement of the handle and outer wiper members. This connection between the handle and the arch has been rendered resilient by me with the object of employing this particular resilient connection to hold the handle and outer wiper members in cooperation with the shield for anchorage purposes, the handle being cooperative with the arch by the exercise of manual abnormal pressure in such a manner that the resiliency of the arch itself may be availed of in obtaining the best efficiency from the contrivance when it is actuated for clearing purposes.

While in my prior patented device I employ wiper members only for the outer surface of the shield, in this device I may adhere to the same principle of construction and operation excepting that I have made provision for equipping the clearing device of these improvements with an inner wiper adapted to operate on the inner surface of the wind shield while the outer wipers are operating upon its outer surface. If therefore the inner wiper is desired, by reason of the novel construction of this invention it may be supplied as a part of the specific equipment of my general clearing device whereas if it is not so desired the clearing device may be supplied without an inner wiper as a part thereof.

The provisions for the foregoing construction and operation of the invention involve the employment of an inner wiper member detachably fitted to the handle of my main clearing device in such a manner that the handle may readily coact in the customary way disclosed in my previous patent, with the inner surface of the wind shield, as by a direct pressure bearing thereon when the inner wiper member is not used; on the other hand, if the inner wiper member is to be used its detachable connection with the handle is such that the anchorage bearing of the handle against the inner side of the wind shield is established through the said inner wiper member directly contacting with the glass of the shield. As respects this feature of the invention it is notable that the inner wiper member is mounted in a peculiar rocking manner upon the handle and as a result said wiper member is adapted to readily accommodate itself to inequalities in the surface of the wind shield and likewise has movement which admits of great ease in positioning the inner and outer wiper members relatively to one another for facilitating the attachment of the clearing device to the wind shield.

With the foregoing and other objects in view the construction and operation of my invention will be readily understood upon reference to the following detail description and to the accompanying drawings, in which:—

Figure 1 is a perspective view of a clearing device embodying certain features of the invention;

Figure 2 is a view of the detachable inner wiper member and the attaching parts therefor, alone;

Figure 3 is a sectional view taken about on the line 3—3 of Figure 6;

Figure 4 is a rear elevation of the device, the coverings of the wiper member being shown broken away and in section and the device being equipped with the inner wiper member;

Figure 5 is a vertical sectional view taken about on the line 5—5 of Figure 4, showing more particularly the connection between the inner wiper member and the handle;

Figure 6 is a side elevation of the device according to the embodiment of Figure 4;

Figure 7 is a sectional view about on the line 7—7 of Figure 6;

Figure 8 is a sectional diagrammatic view showing the method of application of the device to the wind shield when the arch enters the space between the wind shield sections; and Figure 9 is a modified form of handle connection with the arch, said connection being rigid instead of yielding or resilient.

As seen in Figure 1, my device comprises parts equivalent to a large extent to the similar parts shown in the device of my previous patent, including primarily the outer main wiper members 1, disposed in spaced relation and made from a single length of wire bent into somewhat U-form. A clamping plate 2, seen best in Figure 7, is riveted to the outer portion of the spring arch 3 to attach the unit comprising the wiper members 1 to said arch. The wiper members 1 are supplied with the usual tubular casings or coverings preferably of rubber, the latter providing uninterrupted and resilient contact surfaces for effecting the wiping action of the device. The arch 3 is made preferably of flat spring metal and is therefore resilient, and said arch is quite broad in order that it will have a broad bearing against the edge of the shield with which it engages. The object of this broad bearing is to maintain the device in a substantially vertical position as it is moved to and fro across the surface of the shield in its clearing action.

To the inner end of the arch 3 is attached the handle 4 preferably made from a length of wire bent upon itself intermediate its ends to provide said portions formed with lateral extensions 5 passing through openings in flanges 3ª bent to provide channel-like elements at the inner end or side of the arch 3. Preferably the channel portions of the flanges 3ª are of greater area than the thickness of the spaced side portions of the handle 4 so that the handle is permitted to have a certain amount of play pivotally respecting the members 3ª. Normally, however, a coiled spring encircling a pintle 7 on the flanges 3ª, and having connection at one end as seen at 6ª with the handle 4 tends to force the handle in the direction of the wiper members 1. The spring 6 is relied upon to exert sufficient resilient pressure upon the handle to create that degree of pressure of the extremity 8 of said handle, and the wiper members 1, acting upon the opposite sides of the wind shield, to anchor or hold the clearing device in a proper normal position on the shield against accidental displacement or movement.

With a view to obtaining its proper pressure bearing against the inner surfaces of the windshield, the lower portion of the handle is preferably deflected slightly at an angle toward the shield to provide a bearing member the end of which is equipped with a covering element 8 to prevent scratching of the shield.

According to the embodiment of the invention as above described, it will be evident that my clearing device may be disposed upon a wind shield with the arch 3 uppermost and having its broad bearing at spaced points on the uppermost edge of the frame of the shield, the parts 1 and 4 depending from the arch. On the other hand, if desired, by proper adjustment of the wind shield sections the members 1 and 4 may be disposed in an upward direction, the arch 3 received between the edges of the glass sections of the shield and an inverted arrangement of the clearing device obtained in which position it will be just as effective as when in the position first mentioned. The thinness of the arch 3 permits of this latter arrangement of the device to be obtained.

In the actual use of the device as just described it is to be understood that the relative movement of the parts 3 and 4 owing to the connection 5, facilitates the attachment of the device to the wind shield without undue strain upon the parts, and when abnormal pressure of the wiper members 1 on the outer surface of the shield is desired to effect thorough clearing of the surface it will be evident that by pulling inwardly on the handle 4 the upper outer portions of the handle will so abut with the arch 3 as to increase the resilient pressure of the arch acting upon the members 1, in an obvious manner.

In other words, my arch and handle construction is such that my clearer may be shifted across the surface of the windshield by a comparatively light inward pull or pressure upon the handle 4. Sometimes the condition of the outer surface of the wind shield is such that an abnormal pressure of the outer wiper members is desirable to thoroughly clear the shield to facilitate visibility. Under the latter condition an abnormal inward pull on the handle 4 will result in a pivotal movement of the handle about its axis 5 and an abutment of said handle at a point adjacent to said axis with the lower end of the inner side of the arch 3, this abutment affording a leverage by which the flexing of the arch in a manner previously described to afford the extra pressure of the outer wipers against the outer surface of the wind shield.

The inner wiper member attachment for the clearing device is shown best in Figures 2, 4, 5 and 6. In these figures the inner wiper member is designated 9 and consists of a length of wire pivoted to a bracket 10 by being looped about a pivot 11 mounted transversely on the bracket. The ends of the wiper member are equipped with the tubular rubber casings for the customary purposes. The bracket 10 is formed with an extension 12 bent to provide a seat to receive the lower angular portion of the handle 4 and a clamping plate 13 disposable above said angular portion of the handle is adapted to be screwed tightly down thereon by means of a bolt and nut connection 14, whereby the member 12 is firmly attached to the handle. The parts 12, 13 and 14 are so readily displaceable and attachable that the removal and attachment of the member 9 is a matter of great ease.

Sometimes the inner surface of a wind shield becomes covered by moisture or other obstruction interfering with vision and under these conditions the element 9 is useful. Furthermore owing to the mounting of this element upon the handle 4 it is evident that the pressure of the part 9 may always be readily controlled directly by the pull upon the handle and this renders the device easy of operation especially when the inner member 9 does not have any function to perform other than to afford a bearing for the handle against the inner surface of the wind shield. As a matter of fact, the members 1 and 9 may be characterized as main and auxiliary wiper members for the purposes of this description and the action of the parts is clear in view of the foregoing statement of invention and presentation of the detailed construction.

As seen in Figure 9, if desired the handle 4 may be rigidly secured to the arch 3, the resilient connection established by the members 3ª and 6 being dispensed with. Under these conditions the flanges 3ᵇ will snugly receive in the channel portions thereof the upper ends of the handle 4 and no play will be allowed intermediate the members 3 and 4. The slightest movement of the handle rearwardly with this construction will flex the arch 3, obviously.

It will be observed that the handle 4 is so pivoted to the arch 3 that said handle is adapted to act in an effective manner as a lever for controlling the flexing of the arch sufficiently to give any required pressure of the outer wiper members on the outside of the windshield. The anchorage of the clearing attachment being effected by the pressure of the handle through the inner wiper, the handle directly, and the outer wipers against the opposite side of the shield, I do not rely in my device upon any engagement of the same with the frame of the shield, in fact the usual form of beaded edge of the shield is not needed in the practical employment of my invention.

Having thus described my invention, what is claimed as new is:—

1. In a wind shield clearer attachment for wind shields, the combination of an arch adapted to span an edge of the shield and having at one end a wiper member to operate upon the outer surface of the shield, a handle pivotally connected with the other end portion of the arch, and an end of the arch constituting an abutment with which the handle is engagable when pulled away from the wiper member to thereby flex the arch in causing abnormal pressure of the wiper member against the shield.

2. In a wind shield clearer attachment for wind shields, the combination of an arch adapted to span an edge of the shield and having at one end a wiper member to operate upon the outer surface of the shield, a handle pivotally connected with the other end portion of the arch at a point a short distance from the extremity of such end portion so that such extremity forms an abutment against which the handle may bear when pulled away from the wiper member, so as to flex the arch and cause abnormal pressure of the wiper member against the outer surface of the shield, and spring means intermediate the handle and arch and normally acting to cause anchoring pressures of the handle and wiper member against opposite surfaces of the shield.

3. In a wind shield clearer attachment for wind shields, the combination of a resilient arch to span the edge of a wind shield, a wiper member carried by one end of the arch and a handle pivotally supported by the other end, a spring tending to force the wiper member and handle together to maintain them with a normal anchoring pressure against opposite sides of the shield, provisions being made on the arch for limiting the pivotal movement of the handle, whereby a pull on the handle will cause flexing of the arch to facilitate application of abnormal clearing pressure of the wiper member against the shield.

4. In a wind shield clearer attachment of the type set forth, the combination of a wiper member adapted to operate on the outer surface of a shield, a handle operable at the inner side of the shield, a resilient arch spanning an edge of the shield and connecting the wiper member and handle, a spring connection intermediate the handle and arch normally tending to effect anchoring pressure of the handle and wiper member against the shield, the arch comprising means for limiting the pivotal movement of the handle whereby manipulation of the handle is adapted to flex the arch and apply yielding pressure thereof to the connected wiper member.

In testimony whereof I affix my signature.

SAMUEL C. WOLFE.